(12) United States Patent
Bao et al.

(10) Patent No.: US 11,434,382 B2
(45) Date of Patent: Sep. 6, 2022

(54) ENCAPSULATED ANTI-ULTRAVIOLET AGENT AND METHODS FOR PREPARING THE SAME

(71) Applicant: Nano and Advanced Materials Institute Limited, Hong Kong (CN)

(72) Inventors: Su Ping Bao, Hong Kong (CN); Lei Li, Hong Kong (CN); Man Lung Sham, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 314 days.

(21) Appl. No.: 16/660,909

(22) Filed: Oct. 23, 2019

(65) Prior Publication Data

US 2020/0140703 A1    May 7, 2020

Related U.S. Application Data

(60) Provisional application No. 62/754,640, filed on Nov. 2, 2018.

(51) Int. Cl.
| | |
|---|---|
| *C09D 7/48* | (2018.01) |
| *C08K 9/08* | (2006.01) |
| *C09D 7/40* | (2018.01) |
| *C09D 123/12* | (2006.01) |
| *C09D 7/62* | (2018.01) |
| *C09D 5/00* | (2006.01) |
| *C09D 167/00* | (2006.01) |
| *C09D 7/65* | (2018.01) |
| *C08K 9/10* | (2006.01) |

(52) U.S. Cl.
CPC ................ *C09D 7/70* (2018.01); *C08K 9/08* (2013.01); *C08K 9/10* (2013.01); *C09D 5/00* (2013.01); *C09D 7/48* (2018.01); *C09D 7/62* (2018.01); *C09D 7/65* (2018.01); *C09D 7/67* (2018.01); *C09D 7/68* (2018.01); *C09D 7/69* (2018.01); *C09D 123/12* (2013.01); *C09D 167/00* (2013.01)

(58) Field of Classification Search
CPC ............... C08K 9/08; C08K 9/10; C09D 7/48
See application file for complete search history.

(56) References Cited

U.S. PATENT DOCUMENTS

| | | | |
|---|---|---|---|
| 4,861,627 A | 8/1989 | Mathiowitz et al. | |
| 5,272,127 A * | 12/1993 | Mandoh | B01J 13/16 503/200 |
| 6,251,521 B1 * | 6/2001 | Eian | C08F 265/04 428/402.21 |
| 7,157,102 B1 | 1/2007 | Nuwayser | |
| 8,829,083 B2 * | 9/2014 | Lundgard | C09C 3/10 524/80 |
| 2004/0256748 A1 | 12/2004 | Seok et al. | |
| 2011/0003152 A1 | 1/2011 | Grey | |
| 2011/0027376 A1 | 2/2011 | Boey et al. | |
| 2012/0276211 A1 | 11/2012 | Hood et al. | |
| 2017/0071865 A1 | 3/2017 | Goldstein et al. | |

\* cited by examiner

*Primary Examiner* — Vickey Nerangis
(74) *Attorney, Agent, or Firm* — Spruson & Ferguson (Hong Kong) Limited

(57) ABSTRACT

The present disclosure provides an encapsulated particle for anti-UV radiation. The encapsulated particle includes a core comprising an anti-UV agent, and a shell at least partially enclosing the core and comprising a polymer. Due to the presence of the shell, the anti-UV agent can be released into surroundings at a controlled manner. The encapsulated particle can be incorporated into coatings or articles to extend their service life.

13 Claims, 14 Drawing Sheets

ENCAPSULATED ANTI-ULTRAVIOLET AGENT AND METHODS FOR PREPARING THE SAME

CROSS-REFERENCE TO RELATED APPLICATIONS

This application claims the benefit of U.S. Provisional Patent Application No. 62/754,640, filed on 2 Nov. 2018, which is incorporated by reference herein in its entirety.

TECHNICAL FIELD

The present disclosure generally relates to an encapsulated anti-ultraviolet agent and methods for preparing the same.

BACKGROUND ART

The service life of polymeric materials depends on their ability to resist the effects of environmental factors, e.g., solar radiation, heat/cold, moisture, oxygen and pollutants, which can significantly deteriorate their chemical and physical properties. One of the most destructive environmental factors is ultraviolet (UV) radiation, because it is capable of breaking the chemical bonds of the polymeric materials and initiating degradation reactions.

Commercial anti-UV agents have been available to counter the adverse effects of UV radiation. In polymer coating systems, anti-UV agents are generally classified into different types: UV absorbers, quenchers, radical scavengers and peroxide decomposers. Nevertheless, those anti-UV agents are typically used up quickly and consequently their service life is usually shorter than that of polymeric materials, leading to deterioration of their properties due to the failure of the anti-UV agents. Thus, the lifetime of the coatings is shortened.

A need therefore exists for an anti-UV agent to eliminate or at least diminish the disadvantages and problems described above.

SUMMARY OF THE INVENTION

Provided herein is an encapsulated particle comprising: a core comprising an anti-ultraviolet agent; and a first shell enclosing at least partially the core and comprising a first polymer.

In certain embodiments, wherein the anti-UV agent is a light absorber, a light stabilizer, an anti-oxidant, a UV quencher, a radical scavenger, a peroxide decomposer or a combination thereof.

In certain embodiments, the anti-UV agent is zinc oxide, aluminum oxide, titanium oxide or cerium oxide.

In certain embodiments, the core has a size between 30 nm and 20 µm.

In certain embodiments, the first polymer is a polysaccharide, a gelatin, a polyacrylate, a polystyrene, a polyurethane, or a polyester.

In certain embodiments, the first polymer is a metal alginate or poly(methyl methacrylate).

In certain embodiments, the first shell has a thickness between 10 µm and 2 mm.

In certain embodiments, the encapsulated particle further comprises a second shell enclosing at least partially the first shell and comprising a second polymer.

In certain embodiments, the second polymer is a polysaccharide, a gelatin, a polyacrylate, a polystyrene, a polyurethane, a chitosan, or a polyester. In certain embodiments, the second shell has a thickness between 2 µm and 1000 µm.

In certain embodiments, the encapsulated particle further comprises a third shell enclosing at least partially the second shell and comprising a third polymer.

In certain embodiments, the anti-UV agent is zinc oxide, the core has a size between 30 nm and 20 µm, the first polymer is a metal alginate, and the first shell has a thickness between 10 µm and 2 mm. In certain embodiments, the anti-UV agent is Tinuvin 234 (2-(2H-benzotriazol-2-yl)-4, 6-bis(1-methyl-1-phenylethyl)phenol), the core has a size between 500 nm and 20 µm, the first polymer is poly(methyl methacrylate), and the first shell has a thickness between 160 µm and 2 mm.

In certain embodiments, the anti-UV agent is zinc oxide, the core has a size between 30 nm and 500 nm, the first polymer is a metal alginate, the first shell has a thickness between 50 µm and 1 mm, the second polymer is chitosan, and the second shell has a thickness between 2 µm and 1000 µm.

Provided herein is a coating comprising: a matrix; and the encapsulated particles described herein, and the encapsulated particles are present within the matrix.

In certain embodiments, the matrix comprises a polymeric matrix.

In certain embodiments, the coating further comprises a dye.

Provided herein is an article comprising: a matrix; and the encapsulated particles described herein, and the encapsulated particles are present within the matrix.

In certain embodiments, the matrix comprises a polymeric matrix.

In certain embodiments, the article further comprises a dye.

These and other aspects, features and advantages of the present disclosure will become more fully apparent from the following brief description of the drawings, the drawings, the detailed description of certain embodiments and appended claims.

BRIEF DESCRIPTION OF DRAWINGS

The appended drawings contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION OF THE INVENTION

The present disclosure provides an encapsulated particle. The encapsulated particle can comprises a core comprising an anti-UV agent, which is at least partially enclosed by one or more shells such that the anti-UV agent. Without wishing to be bound by theory, it is believed that the shell materials allow the slow or extended release of the anti-UV agent. The core can comprise milled particles, microsphere particles, fluidized particles or other kinds of particles. The anti-UV agent can comprise one or more anti-UV agents selected from the group consisting of UV absorbers, light stabilizers, anti-oxidants, UV quenchers.

Figure 1:
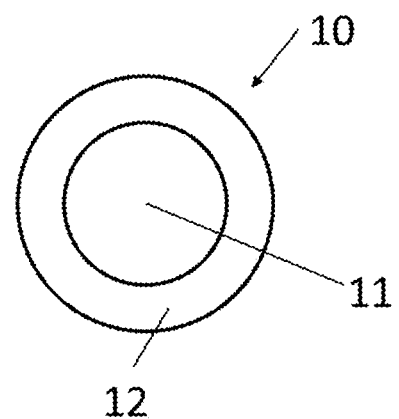
FIG. 1 is a schematic diagram depicting a 1-shell encapsulated particle according to certain embodiments.

The present disclosure provides a 1-shell encapsulated particle. FIG. 1 is a schematic diagram depicting a 1-shell encapsulated particle according to certain embodiments. The encapsulated particle 10 comprises a core 11 and a shell 12. The core 11 comprises an anti-UV agent. The shell 12 encloses the core 11 and comprises a polymer. FIG. 1 depicts the structure of encapsulated particle having a generally spherical shape. However, the encapsulated particle, the core, and the first shell are not limited to spherical shapes and can take any shape, including irregular shapes.

In certain embodiments, the 1-shell encapsulated particle has a size between 20 μm and 2 mm.

In certain embodiments, the anti-UV agent of the 1-shell encapsulated particle is a UV absorber, a light stabilizer, an anti-oxidant, a UV quencher or a combination thereof.

In certain embodiments, the UV absorber is 2-hydroxy-4-octoxybenzophenone (e.g., Thasorb UV-531), hydroxyphenyl-benzotriazole (e.g., Tinuvin P), hydroxyphenyl benzotriazole (e.g., Tinuvin 326), 2-(2H-benzotriazol-2-yl)-4,6-ditertpentylphenol (e.g., Tinuvin 328), hydroxy phenyl benzotriazole (e.g., Chiguard 5411), (2-[2-hydroxy-3,5-di-(1,1-dimethylbenzyl)]-2H-benzotriazole (e.g., Tinuvin 234), 2-2'-Methylenebis[6-(2H-benzotriazol-2-yl)-4-(1,1,3,3-tetramethylbutyl) phenol] (e.g., Tinuvin 360), a benzenepropanoic acid, 3-(2H-benzotriazol-2-yl)-5-(1,1-dimethylethyl)-4-hydroxy-, C7-9-branched and linear alkyl esters (e.g., Eversorb 81), hydroxyphenylbenzotriazole (e.g., Tinuvin 171), (2-2(2'-hydroxy-5'methacryloxyethylphenyl)-2H-benzotriazole (e.g., Tinuvin R 796), 2-(2H-Benzotriazol-2-yl)-6-(1-methyl-1-phenylethyl)-4-(1,1,3,3-tetramethylbutyl) phenol (e.g., Tinuvin 928), 2,4-di-tert-butyl-6-(5-chloro-2H-benzotriazole-2-yl)-phenol (e.g., Uvinul 3027), 2-(2'-hydroxy-3'-s-butyl-5'-t-butyl-phenyl)-Benzotriazole (e.g., Everstab 350), Hydroxyphenylbenzotriazole (e.g., Tinuvin 1130), or 2-(4,6-diphenyl-1,3,5-triazin-2-yl)-5-((hexyl)oxy)-phenol (e.g., Tinuvin 1577).

In certain embodiments, the light stabilizer is hindered amine (e.g., Tinuvin 123, Tinuvin 144 or Tinuvin 152), bis(1,2,2,6,6-pentamethyl-4-piperidyl) sebacate and methyl 1,2,2,6,6-pentamethyl-4-piperidyl sebacate (e.g., Tinuvin 292), bis(1,2,2,6,6-pentamethyl-4-pperidyl)sebacate+1-(methyl)-8-(1,2,2,6,6-pentamethyl-4-pperidyl) sebacate (e.g., Tinuvin 765), bis(2,2,6,6-tetramethyl-4-piperidinyl) sebacate] (e.g., Tinuvin 770), Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) (e.g., Chimassorb 944), 1,6-hexanediamine, N,N-bis(2,2,6,6-tetramethyl-4-piperidinyl)-polymer with 2,4,6-trichloro-1,3,5-triazine, reaction products with, N-butyl-1-butanamine and N-butyl-2,2,6,6-tetramethyl-4-piperidinamine (e.g., Chimassorb 2020), Butanedioic acid, dimethylester, polymer with 4-hydroxy-2,2,6,6-tetramethyl-1-piperidine ethanol (e.g., Tinuvin 622 SF).

In certain embodiments, the anti-oxidant agent is triethylene glycol bis-(3-(3'-tert-butyl-4'-hydroxy-5'-methylphenyl)propionate) (e.g., Irganox 245), 4-((4,6-Bis(octylthio)-1,3,5-triazin-2-yl)amino)-2,6-di-tert-butylphenol (e.g., Irganox 565), pentaerythritol tetrakis(3,5-di-tert-butyl-4-hydroxyhydrocinnamate), pentaerythritol tetrakis(3-(3,5-di-tert-butyl-4-hydroxyphenyl)propionate) (e.g., Irganox 1010), bis-(2,4-di-tert.-butylphenol)pentaerythritol diphosphite (e.g., Irgafos 126), bis(2,4-di-tert.-butyl-6-methylphenyl)-ethyl-phosphite (e.g., Irgafos 38).

In certain embodiments, the UV quencher is titanium dioxide, zinc oxide, aluminum oxide and cerium oxide.

In certain embodiments, the core of the 1-shell encapsulated particle has a size between 30 nm and 20 μm.

In certain embodiments, the shell of the 1-shell encapsulated particle has a thickness between 10 μm and 2 mm.

In certain embodiments, the polymer is a polysaccharide (e.g., cellulose, hemicellulose, polydextrose, galactomannans, gum acacia, or chitin), a gelatin, a polyacrylate, a polystyrene, a polyurethane, or a polyester.

In certain embodiments, the polysaccharide is a metal alginate (e.g., a polymeric alginate with average molecular weight between 50,000 and 800,000). The metal can be an alkali metal (e.g., lithium, sodium, potassium, or cesium).

In certain embodiments, the polymer is polymethylacrylate. In instances in which the polymer is polymethylacrylate, the average molecular weight of the polymethylacrylate is between 50,000 and 300,000.

In certain embodiments, the core and shell have a weight ratio of 1:6 to 1:1.

Figure 2:
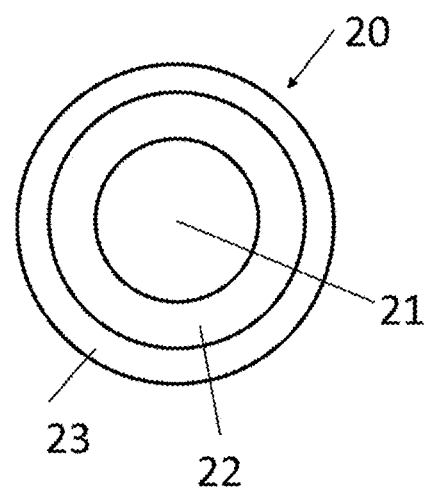
FIG. 2 is a schematic diagram depicting a 2-shell encapsulated particle according to certain embodiments.

The present disclosure provides a 2-shell encapsulated particle. FIG. 2 is a schematic diagram depicting a 2-shell encapsulated particle according to certain embodiments. The 2-shell encapsulated particle 20 comprises a core 21, a first shell 22 and a second shell 23. The core 21 comprises an anti-UV agent. The first shell 22 encloses the core 21 and comprises a first polymer. The second shell 23 encloses the first layer 22 and comprises a second polymer. FIG. 2 depicts the structure of encapsulated particle having a generally spherical shape. However, the encapsulated particle, the core, the first shell, and the second shell are not limited to spherical shapes and can take any shape, including irregular shapes.

The first shell and the second shell can comprise different materials and have different functions. In certain embodiments, the first shell may absorb UV light or scavenge radicals and the second shell may provide structural support for capsule formation. In certain embodiments, the first shell may scavenge radicals and the second shell may absorb UV light. In certain embodiments, the first shell may absorb UV light and the second shell may scavenge radicals.

In certain embodiments, the 2-shell encapsulated particle has a size between 20 μm and 2 mm.

In certain embodiments, the core of the 2-shell encapsulated particle has a size between 30 nm and 20 μm.

In certain embodiments, the first shell of the 2-shell encapsulated particle has a thickness between 10 μm and 1000 μm.

In certain embodiments, the first polymer is a polysaccharide, a gelatin, a polyacrylate, a polystyrene, a polyurethane, or a polyester.

In certain embodiments, the second shell of the 2-shell encapsulated particle has a thickness between 2 μm and 1000 μm.

In certain embodiments, the second polymer is a polysaccharide, a gelatin, a polyacrylate, a polystyrene, a polyurethane, a chitosan, or a polyester.

In certain embodiments, the core, the first shell and second shell have a weight ratio of 1:6:1 to 1:1:1.

The present disclosure provides a multi-layered particle comprising consecutive layers, which comprise an anti-UV agent. In certain embodiments, the layers are polymer layers (e.g., PMMA layers). The layers can be semi-concentric.

Figure 3:
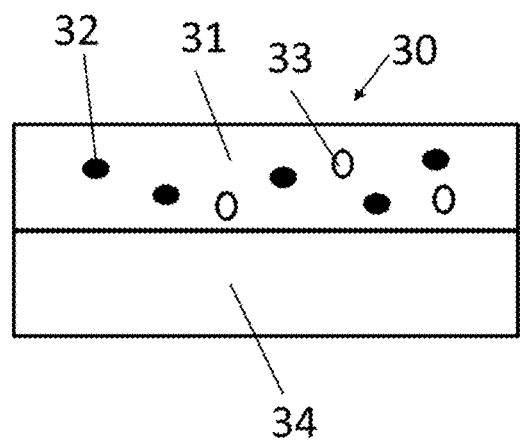
FIG. 3 is a schematic diagram depicting a coating according to certain embodiments.

The present disclosure provides a coating comprising the encapsulated particles described herein. FIG. 3 is a schematic diagram depicting a coating according to certain embodiments. The coating 30 comprises a matrix 31, and encapsulated particles 32 being present in the matrix. The coating 30 can further comprise a dye 33 being present in the matrix 34. The coating 30 is covered on a substrate 34.

In certain embodiments, the matrix comprises a polymeric matrix. The polymeric matrix can comprise polyvinyl chloride resin (PVC), epoxy resin, nitrocellulose, polyester resin, polyacrylate, polyacrylic, polyurethane, alkyd resin, or copolymers or mixtures of these polymer resins).

In certain embodiments, the dye is an organic compound (e.g., pigment red 3, pigment blue 60, pigment violet 23, pigment orange 43, pigment green 7).

In certain embodiments, the dye is an inorganic compound (e.g., carbon black, cerulean blue, chrome green, cobalt violet, cadmium orange, titanium white, Prussian blue, cadmium green, chrome yellow, red ochre).

In certain embodiments, the encapsulated particles in the coating have a concentration by weight between 0.1% and 5%.

The coating can be a protective coating, an optical coating, a waterproof coating, an antimicrobial coating, an electrical insulating coating, a paint, a lacquer, an adhesive, or a lubricant.

Figure 4:
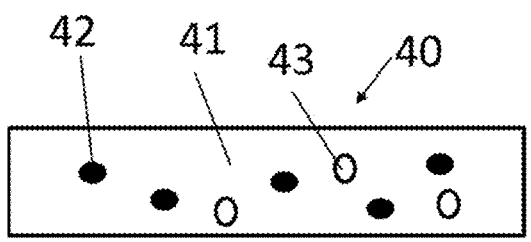
FIG. 4 is a schematic diagram depicting an article according to certain embodiments.

The present disclosure provides an article comprising the encapsulated particles described herein. FIG. 4 is a schematic diagram depicting an article according to certain embodiments. The article 40 comprises a matrix 41 and encapsulated particles 42 being present in the matrix 41. The article 40 can further comprises a dye 43 being present in the matrix 41.

In certain embodiments, the matrix comprises a polymeric matrix. The polymeric matrix can comprise acrylonitrile butadiene styrene resin (ABS), styrene-acrylonitrile resin (SAN), polyvinyl chloride resin (PVC), polyamide (PA), polyethylene terephthalate (PET), polybutylene terephthalate (PBT), polycarbonate (PC), polyoxymethylene (POM), polyethylene (PE), polypropylene (PP), polystyrene (PS), poly(methyl methacrylate) (PMMA), acrylics, poly(styrene-butadiene-styrene) (SBS), polyurethane (PU), or copolymers or mixtures of these polymer resins).

In certain embodiments, the dye is an organic compound (e.g., pigment yellow 108, pigment orange 36, pigment red 177, pigment blue 60, pigment violet 23).

In certain embodiments, the dye is an inorganic compound (e.g., iron oxide, cadmium sulphoselenide, ultramarine blue, carbon black, chrome green, cobalt violet, cadmium orange, or titanium white.

In certain embodiments, the encapsulated particles in the article have a concentration by weight between 0.1% and 10%.

The article can be a tool, a household product, a plastic product, a construction component, or a mechanical component. The presence of the encapsulated particles in coatings or articles can provide a number of benefits, e.g., improving their mechanical resistance, color, surface hardness and gloss retention, suppressing coating surface cracking, chalking, blistering, delamination or migration of components to surface.

Figure 5:
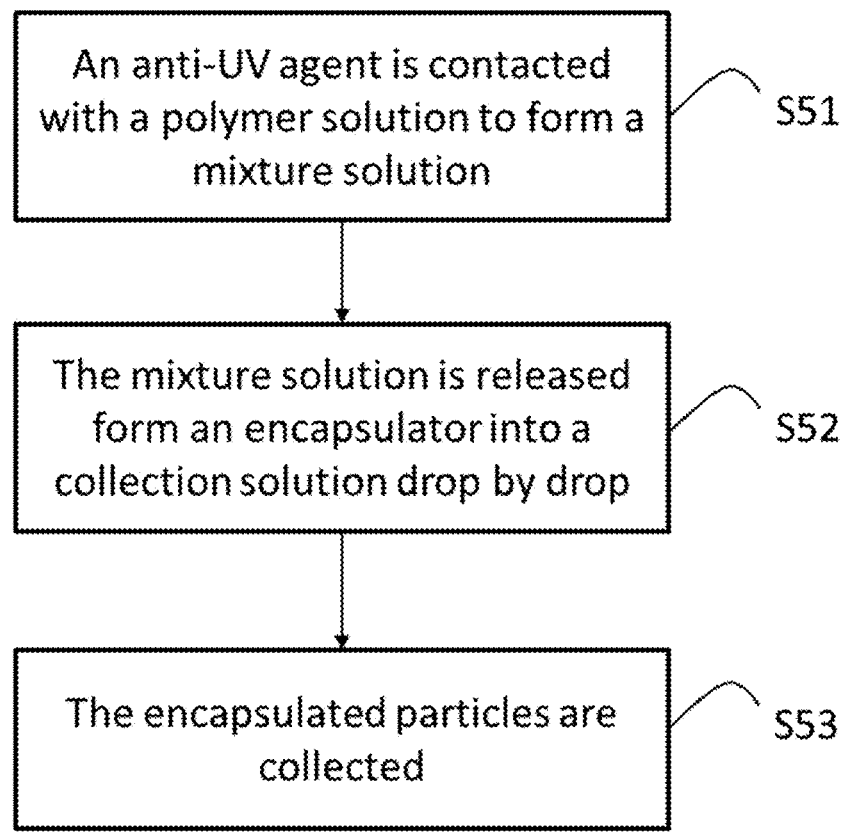
FIG. 5 is a flow chart depicting a method for preparing the encapsulated particles according to certain embodiments.

The present disclosure provides methods for preparing the encapsulated particles described herein. FIG. 5 is a flow chart depicting a method for preparing the encapsulated particles according to certain embodiments. In step S51, an anti-UV agent is contacted with a polymer solution to form a mixture. In step S52, the mixture is released from an encapsulator into a collection solution drop by drop to form encapsulated particles. In step S53, the encapsulation particles are collected from the collection solution.

Figure 6:
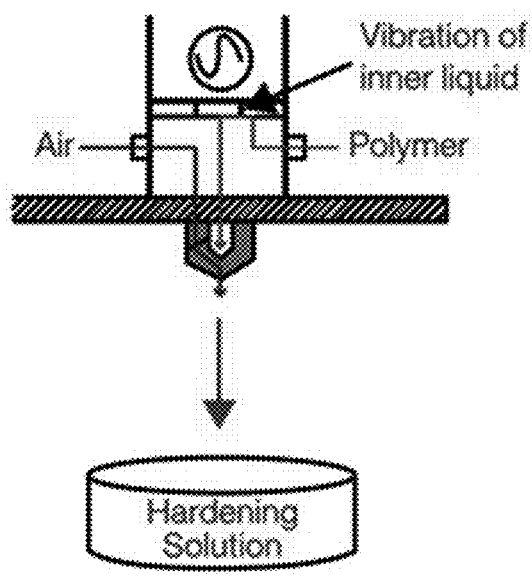
FIG. 6 is a schematic diagram depicting an encapsulator according to certain embodiments.

FIG. 6 is a schematic diagram depicting an encapsulator (Model: B-390 BUCHI Corporation in Switzerland) according to certain embodiments. The encapsulator can be fitted with a single nozzle or concentric nozzle. The single nozzle has only one passage for feeding a core material. The concentric nozzle can include an inner passage and an outer passage aligned concentrically with the inner passage. The encapsulator can further include heated lines to ensure the mixtures being pumped to the nozzle are sufficiently liquidized. Vibration and flow rates can also be adjusted to control the size of droplets. The encapsulator can further include additional concentrically aligned outer passages to form additional layers. The working parameters of the encapsulator should be defined so as to form consecutive droplets of mixture.

The encapsulated particles described herein can be prepared by a single nozzle system or a concentric nozzle system. For a single nozzle system, the core material is pumped through its passage. For a concentric nozzle system, the core material can be pumped through the inner passage, and a polymer solution for forming the shell can be pumped through the outer passage. The terminal ends of the inner passage and the outer passage are aligned so that when the core material and the polymer solution are released from each passage, the polymer solution encapsulates the core material and forms a stream of layered droplets. This stream of layered droplets can fall under the force of gravity into a liquid bath which serves to collect the droplets and further harden the droplets so that encapsulated particles are formed.

According to certain embodiments, the encapsulated particles are prepared by an encapsulation method. In particular, the concentric nozzle system is used in the encapsulator. The core material from the inner nozzle is released, which is then enclosed by the polymer solution from the outer nozzle. The encapsulation method may proceed under ambient temperature or temperatures adequate to liquefy the mixture fabricated.

According to certain embodiments, the encapsulated particles are prepared by a solution-precipitation method. In particular, a single nozzle is used in the encapsulator. The mixture containing anti-UV agents are soluble before it is fed into the encapsulator and it precipitates when coming in contact with the collection solution. The mixture is fed to the encapsulator and extruded out of the nozzle to form consecutive droplets into the collection solution. Since the mixture cannot be dissolved in the collection solution, the droplets are hardened and isolated from the collection solution to form the encapsulated particles. The encapsulated particles are isolated from the suspension and repeatedly washed with water.

Example 1

Figure 7A:
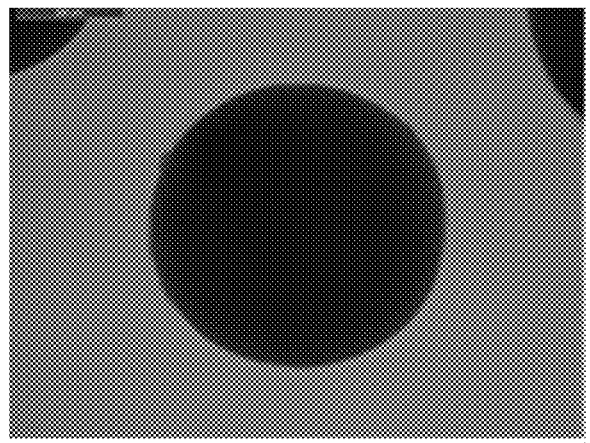
FIG. 7A shows an optical image of a 1-shell encapsulated ZnO@sodium alginate (SA) particle.
Figure 7B:
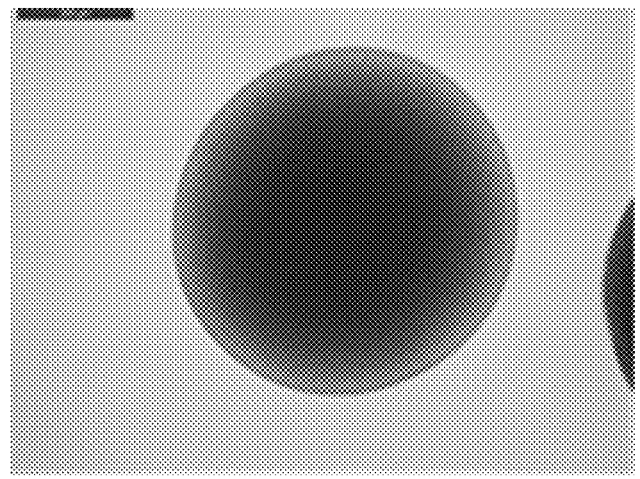
FIG. 7B shown an optical image of a 2-shell encapsulated ZnO@SA@chitosan particle.
Figure 8A:
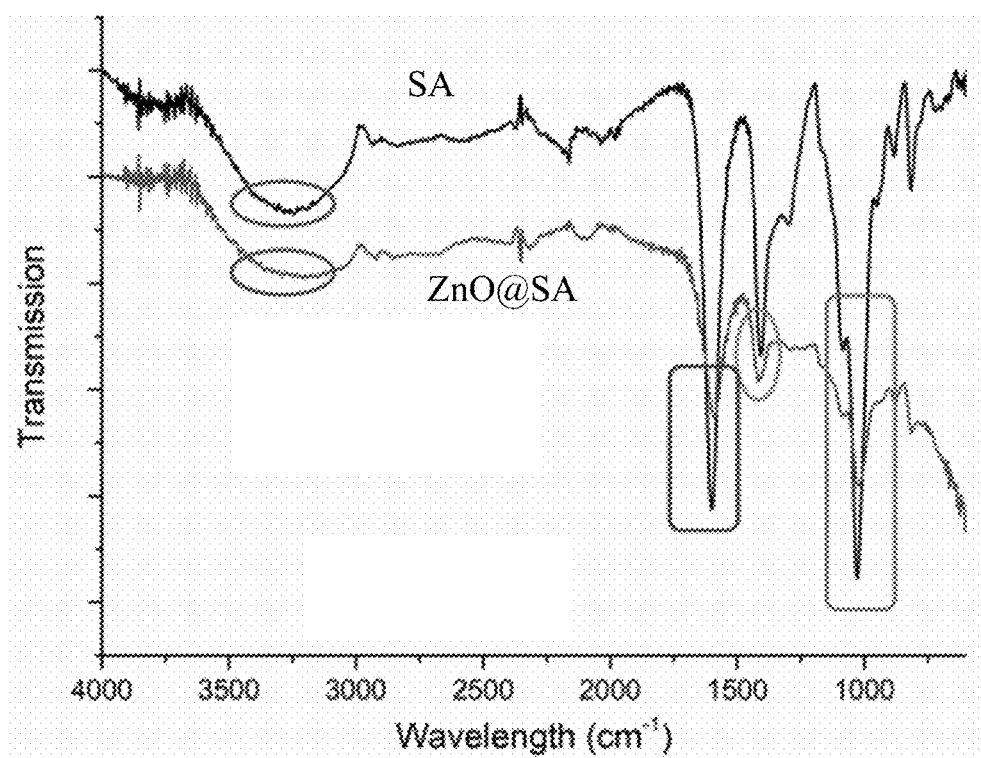
FIG. 8A shows a Fourier-transform infrared spectrum of a 1-shell encapsulated ZnO@SA particle.
Figure 8B:
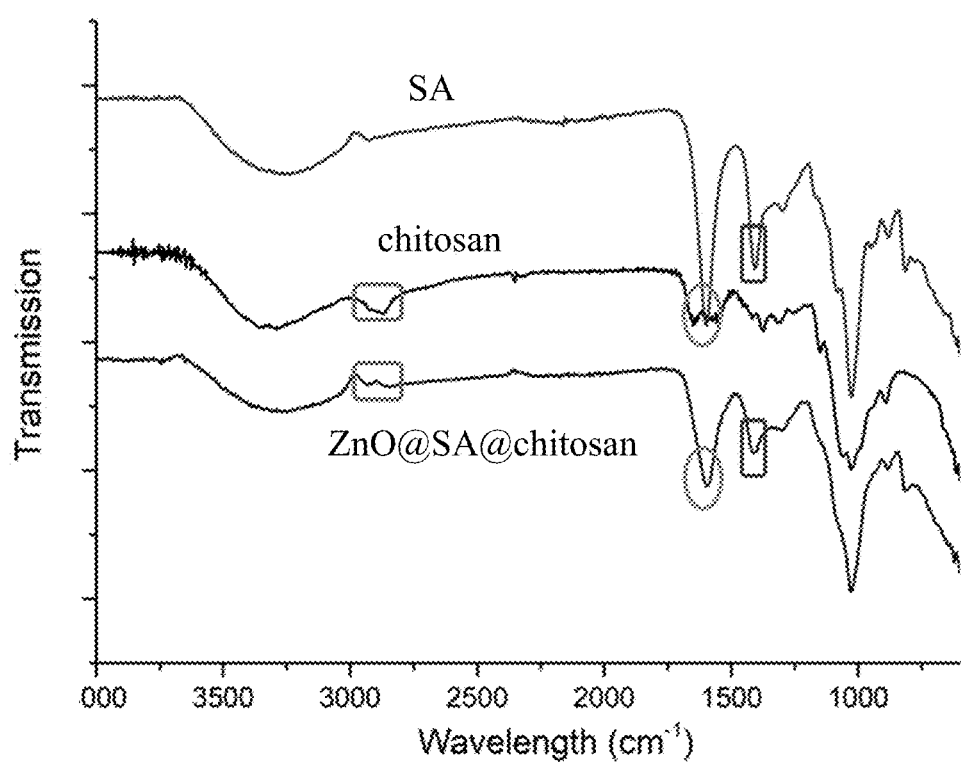
FIG. 8B shows a Fourier-transform infrared spectrum of a 2-shell encapsulated ZnO@SA@chitosan particle.
Figure 9A:
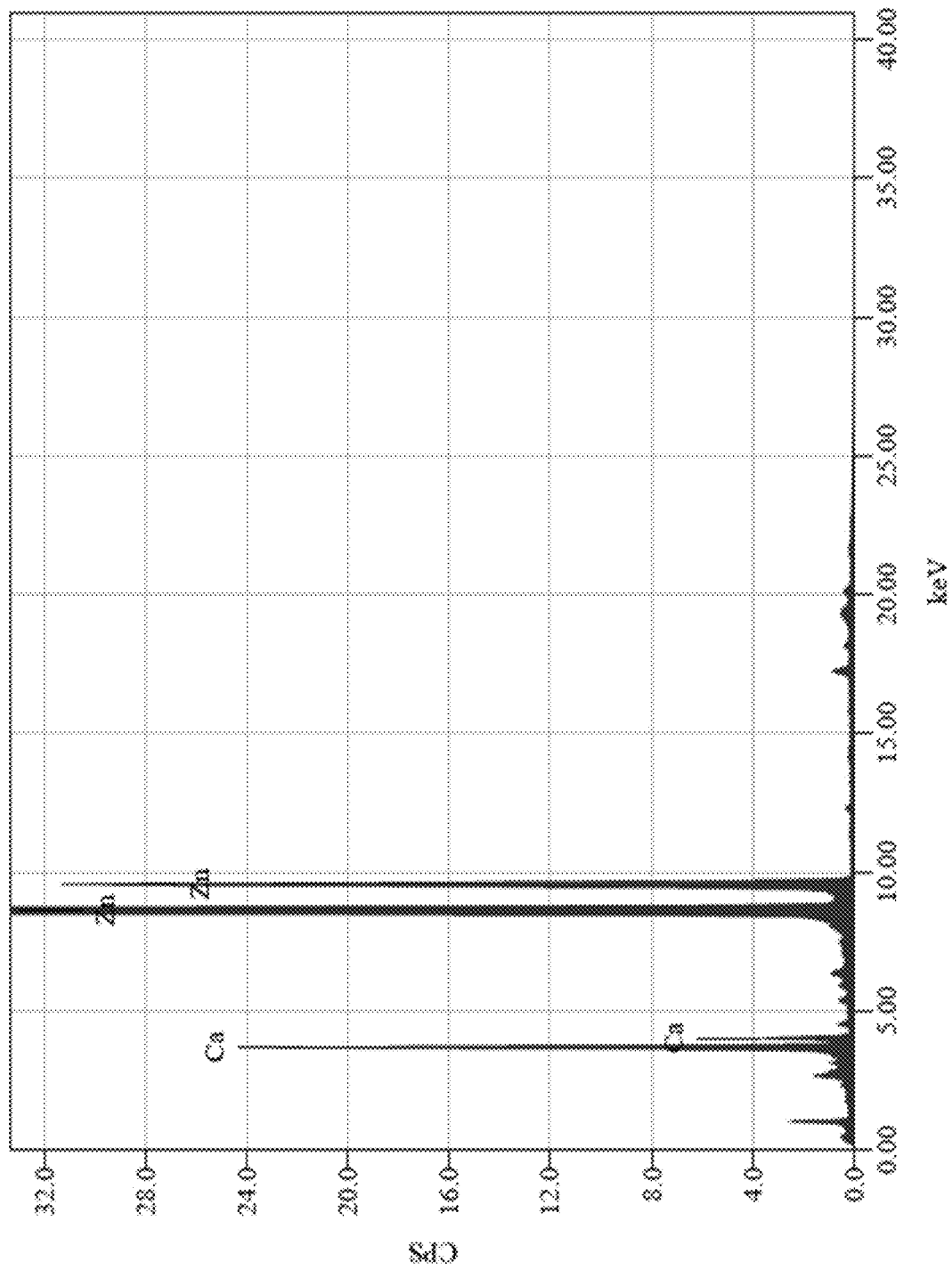
FIG. 9A shows a X-ray fluorescence spectrum of a 1-shell encapsulated ZnO@SA particle.
Figure 9B:
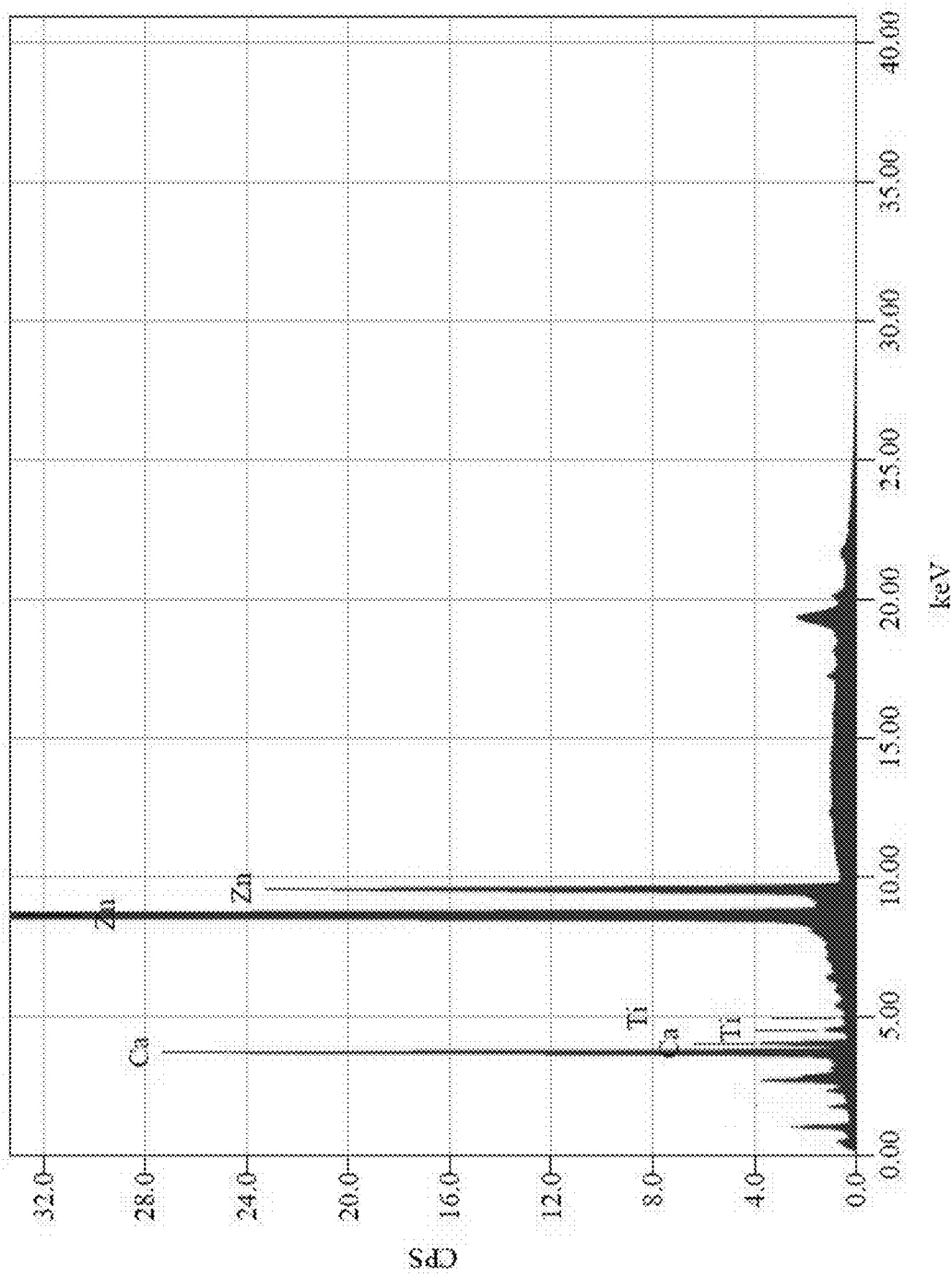
FIG. 9B shows a X-ray fluorescence spectrum of a 2-shell encapsulated ZnO@SA@chitosan particle.

20 g of zinc oxide (granule size of 1 μm) were ball milled to nanoparticles (particle size<100 nm). Then, 1 g of zinc oxide nanoparticles were dispersed into 200 mL of 1.2% sodium alginate (SA) water solution using a ultrasonicator at a magnitude of 40% for 10 min to obtain an aqueous solution containing 1.2% sodium alginate and 0.5% zinc oxide nanoparticles. This feeding mixture was connected to an encapsulator and extruded out of the nozzle (nozzle size 300 μm) to form consecutive droplets at ambient temperature. The droplets were hardened in the collection bath and the bath was an aqueous solution of calcium chloride (1%), which acted as a hardening agent. The resulting 1-shell encapsulated particles (ZnO@SA) were isolated from the suspension and repeatedly washed with purified water and characterized by optical microscopy (FIG. 7A), Fourier-transform infrared spectroscopy (FIG. 8A) and X-ray fluorescence spectroscopy (FIG. 9A). 10 g of the obtained 1-shell encapsulated particles were dispersed in 20 ml of chitosan solution (0.5%, pH adjusted to 4-5) and stirred at a rate of 100 rpm for 10 min. The resulting 2-shell encapsulated particles (ZnO@SA@chitosan) were isolated from the aqueous and repeatedly washed with purified water and characterized by optical microscopy (FIG. 7B), Fourier-transform infrared spectroscopy (FIG. 8B) and X-ray fluorescence spectroscopy (FIG. 9B).

Example 2

The encapsulated particles in Example 2 were obtained in the same manner as shown in Example 1 except that zinc oxide was replaced by Tinuvin 234 (2-[2-hydroxy-3,5-di(1,1-dimethylbenzyl)]-2H-benzotriazole, purchased from BASF), which is pretreated by ball milling to nano-size (size<700 nm).

Example 3

Figure 10A:
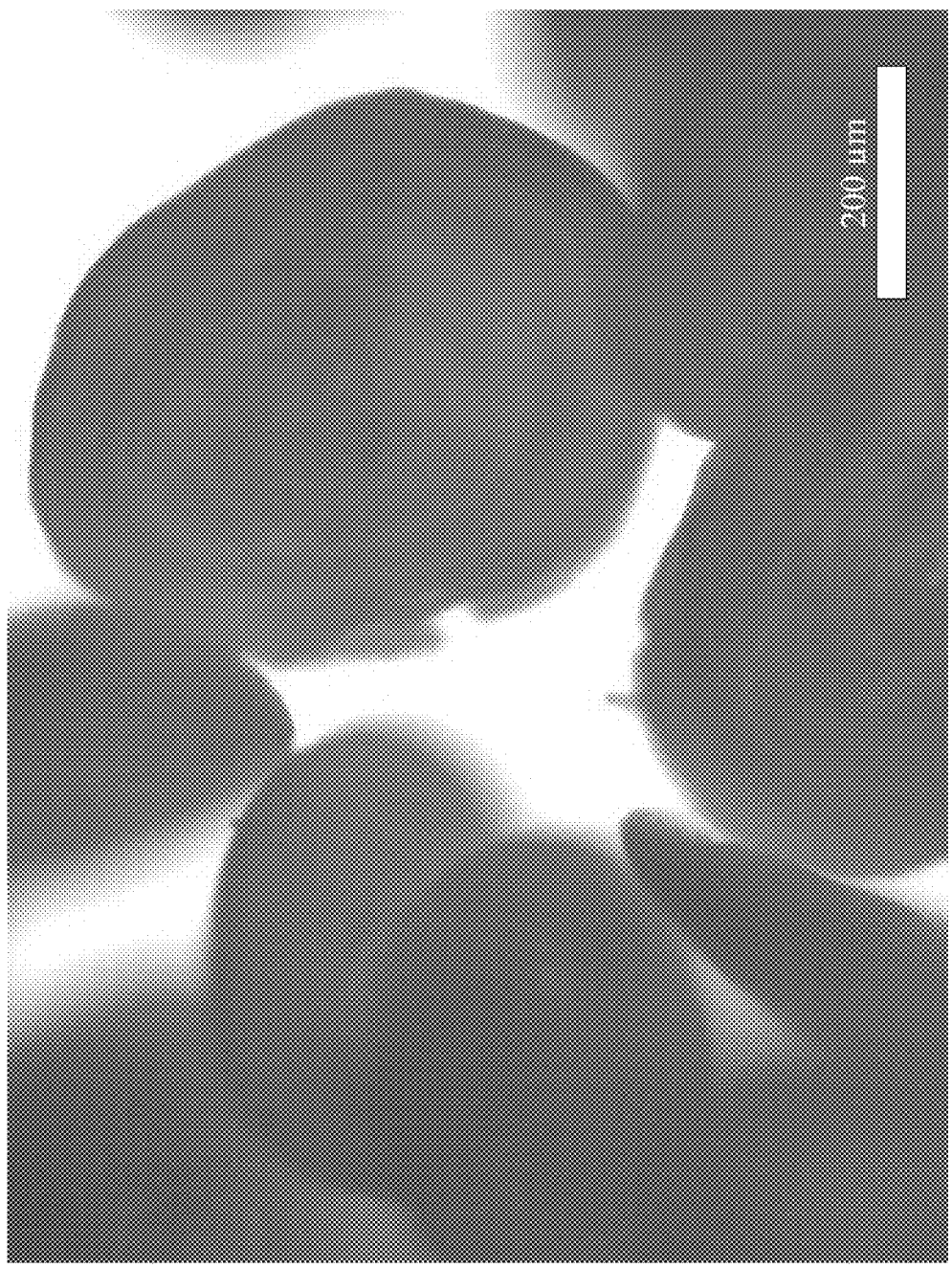
FIG. 10A shows an optical image of a 1-shell encapsulated Tinuvin 234@PMMA particle.
Figure 10B:
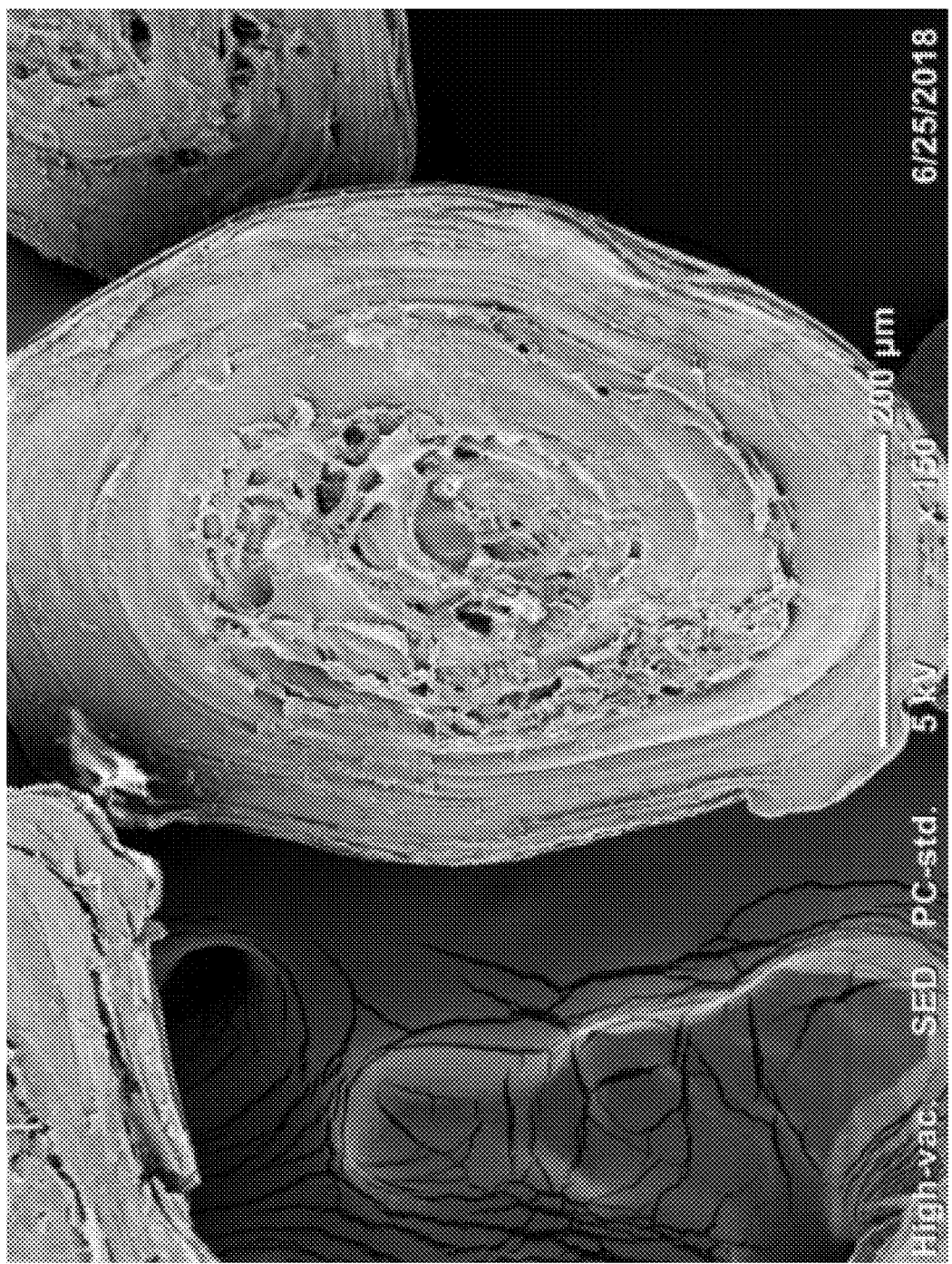
FIG. 10B shows a scanning electron microscope image of a 1-shell encapsulated Tinuvin 234@PMMA particle.

6 g of Tinuvin 234 and 13.6 g of PMMA were dissolved in 80.4 g of DMF with stirring. The mixture was then filtered by funnel to obtain a clear solution. This feeding solution was connected to the encapsulator and extruded out of the nozzle (nozzle size 120 μm) to form consecutive droplets at ambient temperature. The droplets were hardened in the collection bath under the nozzle and the bath was an aqueous solution The resulting multi-layered particles were isolated from the suspension and repeatedly washed with purified water and characterized by optical microscopy (FIG. 10A), and scanning electron microscopy (FIG. 10B). As shown in FIG. 10B, the particle comprises consecutive semi-concentric layers of PMMA, thus forming the particle. The layers of PMMA comprise Tinuvin 234.

Example 4

The encapsulated particles were obtained in the same manner as in Example 3 except that 6 g of Tinuvin 234 and 13.6 g of PMMA dissolved in 80.4 g of DMF was replaced by 4.5 g of nano-sized zinc oxide (nano-ZnO, particle size<100 nm) and 15.6 g of PMMA dissolved in 79.9 g of DMF.

Example 5

The 2-shell encapsulated particles obtained in example 1 (ZnO@SA@chitosan) or example 2 (Tinuvin 234@SA@chitosan) were dispersed in 20 g of unsaturated polyester resin (formed by the reaction of ethylene glycol and maleic acid) using a magnetic stirrer at a stirring rate of 800 rpm/min to obtain a stable dispersion. Then 0.09 g of red dye (pigment red 177) was added into the resin. Control samples with pure nano-ZnO and Tinuvin 234 were also prepared as listed in Table 1

TABLE 1

| Sample | Polyester resin | Red dye | Additives |
|---|---|---|---|
| 1 (blank, pure polyester resin) | 20 g | 0.09 g (0.45%) | none |
| 2 (with nano-ZnO, <100 nm) | 20 g | 0.09 g (0.45%) | nano-ZnO, 0.1 g, 0.5% |
| 3 (with ZnO@SA@chitosan) | 20 g | 0.09 g (0.45%) | ZnO@SA@chitosan, 0.444 g, 0.5% based on ZnO |
| 4 (with Tinuvin 234) | 20 g | 0.09 g (0.45%) | Tinuvin 234, 0.1 g, 0.5% |
| 5 (with Tinuvin 234@SA@chitosan) | 20 g | 0.09 g (0.45%) | Tinuvin 234@SA@chitosan, 0.444 g, 0.5% based on Tinuvin 234 |

Figure 11:
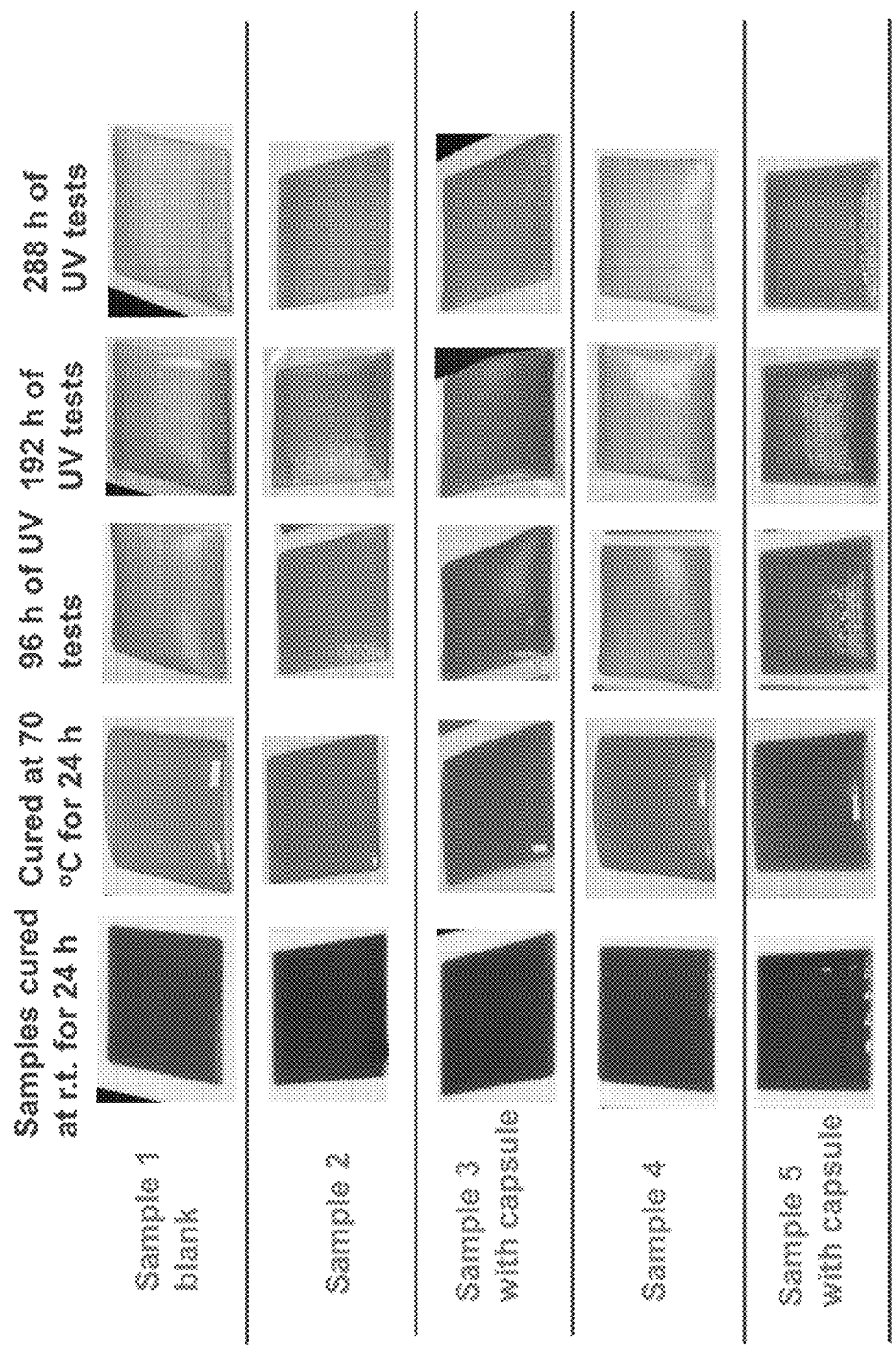
FIG. 11 shows color deviations of samples in an accelerated weathering test.

All the samples were firstly cured at room temperature for 24 hr and cured at 70° C. for 24 hr. After curing, the samples were put into accelerated weathering (QUV) chamber for accelerated weathering tests. The conditions for testing were selected according to cycle 1 of the ASTM G154 standard (standard practice for operating fluorescent light apparatus for UV exposure of non-metallic materials). UV exposure was obtained with typical irradiance of 0.89 W/m$^2$/nm and the approximate wavelength is 340 nm. The detailed program circle was set as follows: 8 hr UV exposure (simulating sunlight) at 60° C.; and 4 hr condensation at 50° C. The color deviations of the samples under UV exposure were recorded by taking photos of the samples as show in FIG. 11.

Figure 12:
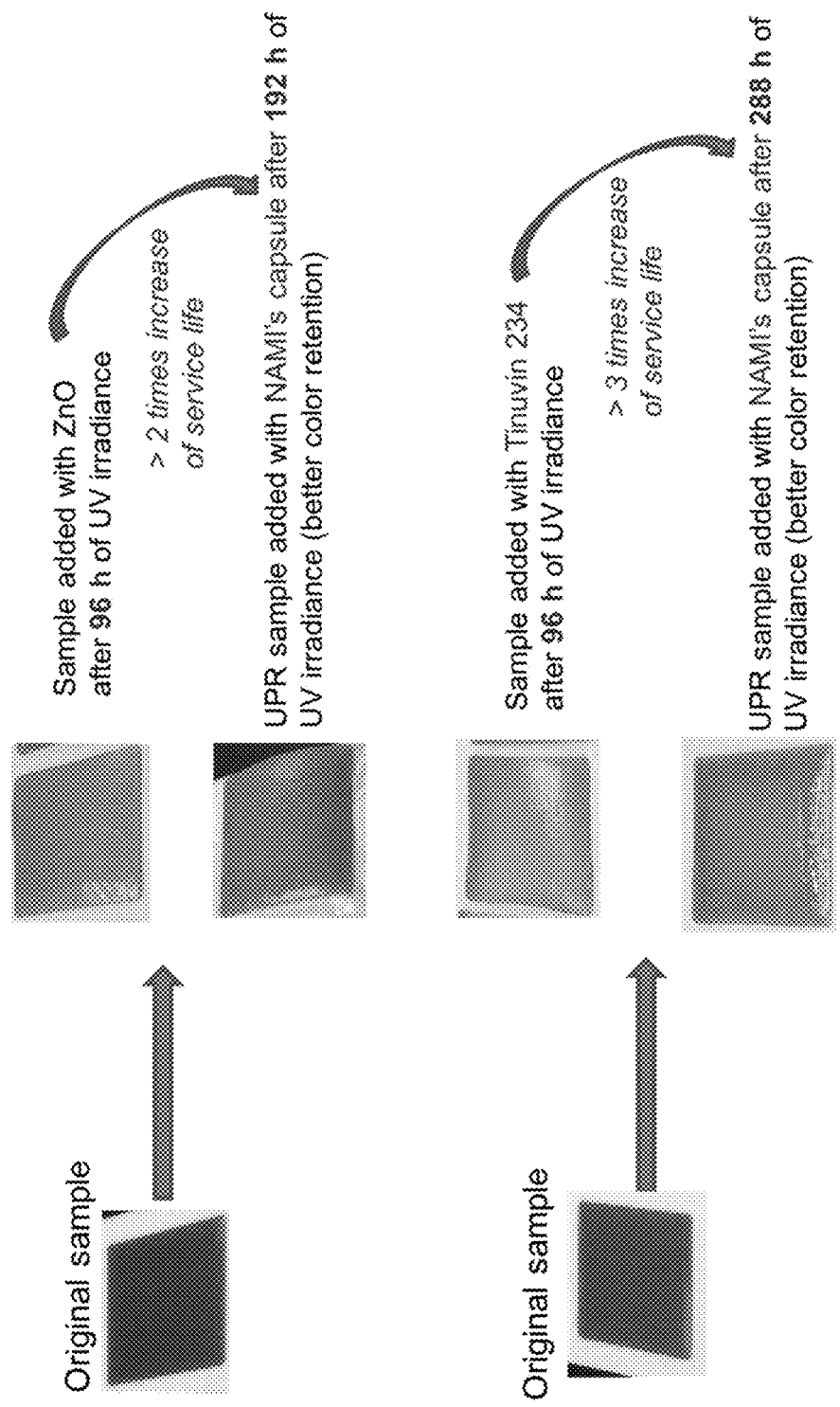
FIG. 12 shows result comparison of samples in color deviation in an accelerated weathering test.

As shown in FIG. 12, sample 3 (with ZnO@SA@chitosan) has less color deviation after 192 hr of UV exposure than sample 2 (with nano-ZnO only) after 96 hr of UV exposure, indicating the service life of sample 3 can be extended to more than 200% of that of sample 2. Sample 5 (with Tinuvin 234@SA@chitosan) has less color deviation after 288 hr of UV exposure than sample 4 (with Tinuvin 234 only) after 96 hr of UV exposure, indicating the service life of sample 5 is extended over 300% of that of sample 4.

Example 6

The 1-shell (with ZnO@SA) and 2-shell (with ZnO@SA@chitosan) encapsulated particles obtained in Example 1 was respectively dispersed in an epoxy resin system consisting of an epoxy resin 156 (diglycidyl ether of bisphenol A) and a curing agent (amine-based) with the ratio of 3 to 1. The content of ZnO nanoparticles was fixed to be 0.15% of epoxy resin. Control samples without anti-UV agent and with pure nano-ZnO were also prepared as listed in Table 2.

TABLE 2

| Sample | Epoxy resin | Curing agent | Additives |
|---|---|---|---|
| 1 (blank sample) | 45 g | 15 g | none |
| 2 (with nano-ZnO, <100 nm) | 45 g | 15 g | Nano-ZnO, 0.09 g, 0.15% |
| 3 (with ZnO@SA) | 45 g | 15 g | ZnO@SA (the content of Nano-ZnO: 0.09 g, 0.15%) |
| 4 (with ZnO@SA@chitosan) | 45 g | 15 g | ZnO@SA@chitosan (the content of Nano-ZnO: 0.09 g, 0.15%) |

Figure 13:
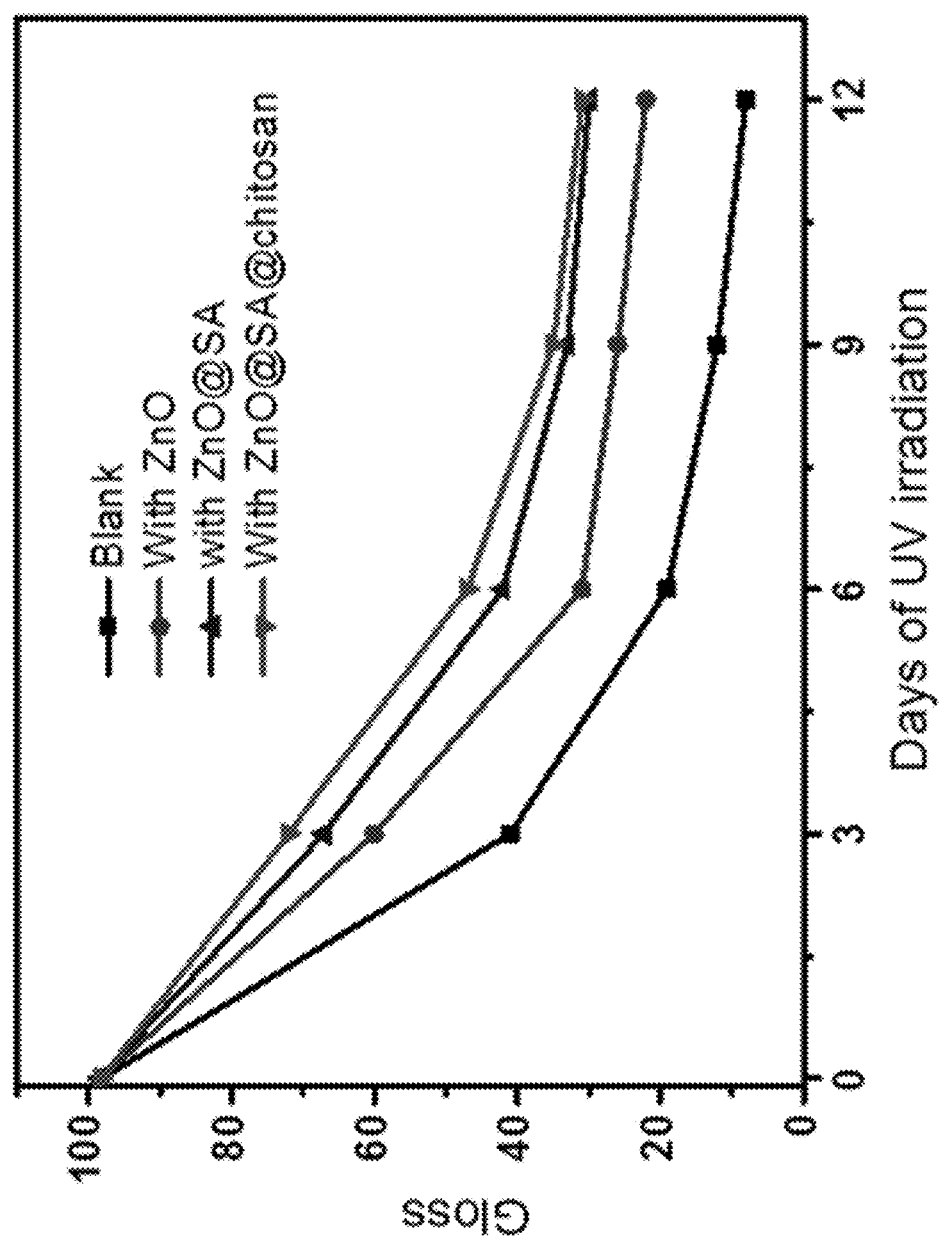
FIG. 13 shows gloss values of samples under UV exposure.

After curing, the epoxy samples were placed into QUV chamber for accelerated weathering tests. The conditions for testing were selected according to cycle 1 of the ASTM G154 standard (standard practice for operating fluorescent light apparatus for UV exposure of non-metallic materials). UV exposure was obtained with typical irradiance of 0.89 W/m$^2$/nm and the approximate wavelength was 340 nm. The program circle was set as follows: 8 hr UV exposure (simulating sunlight) at 60° C.; and 4 hr condensation at 50° C. The gloss values of the epoxy samples under UV exposure were recorded as show in FIG. 13. Both the 1-shell (sample 3) and 2-shell (sample 4) encapsulated particles are beneficial to retard the gloss loss of the epoxy. The epoxy sample with 2-shell capsules has less gloss loss after 21 days of UV exposure than that with nano-ZnO after 9 days of UV exposure, indicating the service life of the epoxy with the encapsulated anti-UV agent can be extended over 200% than that with anti-UV agent. The epoxy sample with 2-shell encapsulated particle (sample 4) exhibits similar gloss to the epoxy sample with the 1-shell encapsulated particle (sample 3) after 12 h of UV irradiance. However, in the initial stages (3 hr and 6 hr), sample 4 still performs better than sample 3, indicating that the second chitosan coating has a beneficial effect.

Example 7

Polypropylene (PP) was selected as a polymer matrix and the multi-layered particles obtained in Example 3 are dispersed in the matrix. The blended PP samples were fabricated by extrusion utilizing single screw torque rheometer. The fabricated samples were compressed into plates and cut into dumbbell samples (1.5 mm in thickness) using standard dies. Control samples without anti-UV agent and those with pure Tinuvin 234 were also prepared as shown in Table 3.

TABLE 3

| Sample | Additives |
|---|---|
| 1 (blank sample) | none |
| 2 (with Tinuvin 234) | 0.5% |
| 3 (with Tinuvin 234@PMMA) | Capsules, content of Tinuvin 234: 0.5% |

Then, the dumbbell samples were placed into QUV chamber for accelerated weathering tests according to cycle 1 of the ASTM G154 standard. The samples were taken out at predetermined intervals for tensile test to investigate their tensile strengths. Tensile strengths of the samples were measured before and after UV exposure and the results are shown in Table 4.

TABLE 4

| | | Results of tensile tests | | |
| Sample | | Before UV exposure | After UV exposure for 108 hr | After of UV exposure for 324 hr |
|---|---|---|---|---|
| 1 (blank sample) | Tensile strength (MPa) | 37.9 | 28.9 | 14.1 |
| 2 (with Tinuvin 234) | | 37.3 | 36.0 | 32.3 |
| 3 (with Tinuvin 234@PMMA) | | 37.7 | 36.1 | 36.1 |

As shown in Table 4, there is a rapid decrease of tensile strength for PP when exposed to UV irradiance for more than 324 hr. At the same UV exposure for 324 hr, the addition of Tinuvin 234 induces a reduction of tensile strength by 13% while there is only less than 5% decrease of tensile strength when the multi-layered particle was incorporated.

Example 8

Polypropylene (PP) was selected as a polymer matrix and the encapsulated particles obtained in Example 3 were dispersed in the polymer matrix. The blended PP samples were fabricated by extrusion utilizing single screw torque rheometer. The fabricated samples were compressed into plates and cut into dumbbell samples (1.5 mm in thickness) using standard dies as shown in example 7. Control samples with pure Tinuvin 234 were also prepared as shown in Table 5.

TABLE 5

| Sample | Additives |
|---|---|
| 1 (with Tinuvin 234) | Tinuvin 234, 0.15% |
| 2 (with capsules) | Capsules, content of Tinuvin 234: 0.15% |
| 3 (with Tinuvin 234) | Tinuvin 234, 0.3% |
| 4 (with capsules) | Capsules, content of Tinuvin 234: 0.3% |
| 5 (with Tinuvin 234) | Tinuvin 234, 0.6% |
| 6 (with capsules) | Capsules, content of Tinuvin 234: 0.6% |

Then the dumbbell samples were placed into QUV chamber for accelerated weathering tests according to cycle 1 of the ASTM G154 standard. The samples were taken out at predetermined intervals for tensile test to investigate their tensile strengths. Tensile strengths of the samples were measured before and after UV exposure and the results are shown in Table 6.

TABLE 6

| | Results of tensile tests | | | |
|---|---|---|---|---|
| Sample | | Before UV exposure | After UV exposure for 108 hr | After UV exposure for 324 hr | After UV exposure for 648 hr |
| 1 (with 0.15% Tinuvin 234) | Tensile | 37.5 | 34.7 | 29.8 | 25.3 |
| 2 (with 0.15% capsules) | strength | 37.7 | 35.3 | 35.0 | 31.3 |
| 3 (with 0.3% Tinuvin 234) | (MPa) | 37.6 | 35.5 | 31.8 | 27.7 |
| 4 (with 0.3% capsules) | | 37.8 | 36.1 | 35.8 | 32.2 |
| 5 (with 0.6% Tinuvin 234) | | 37.8 | 36.1 | 34.8 | 30.9 |
| 6 (with 0.6% capsules) | | 37.8 | 36.5 | 36.5 | 35.4 |

As shown in Table 6, there is a rapid decrease of tensile strength for PP when exposed to UV irradiance for more than 648 hr. In all 3 cases of predetermined addition level of anti UV agent (0.15%, 0.3% or 0.6%), the samples with capsules perform better than with anti UV agent in UV-resistance tests, as evidenced by the slower reduction of tensile strength of samples with capsuled UV-resistant agent. For samples with anti UV agent or capsules, increasing the addition amount obviously results in better retention of tensile strength at the cost of raw materials due to high price of UV-resistant agents. Thus, incorporation of 0.6% of capsules provided the highest tensile strength with the highest cost to performance ratio among those specimens fabricated.

Example 9

The encapsulated particle obtained in Example 3 was dispersed in a waterborne acrylic coating (waterborne wood coating purchased from Akzo Nobel Swire Paints Ltd.). The content of Tinuvin 234 was fixed to be 0.5% of waterborne acrylic coating. Control samples without anti-UV agent and with pure Tinuvin 234 were also prepared as listed in Table 7. All 3 coating samples were then applied on pinewood plate ready for testing.

TABLE 7

| Sample | Additives |
|---|---|
| 1 (blank sample) | none |
| 2 (with Tinuvin 234) | Tinuvin 234, 0.5% |
| 3 (with capsules) | Capsules, (the content of Tinuvin 234: 0.5%) |

Figure 14:
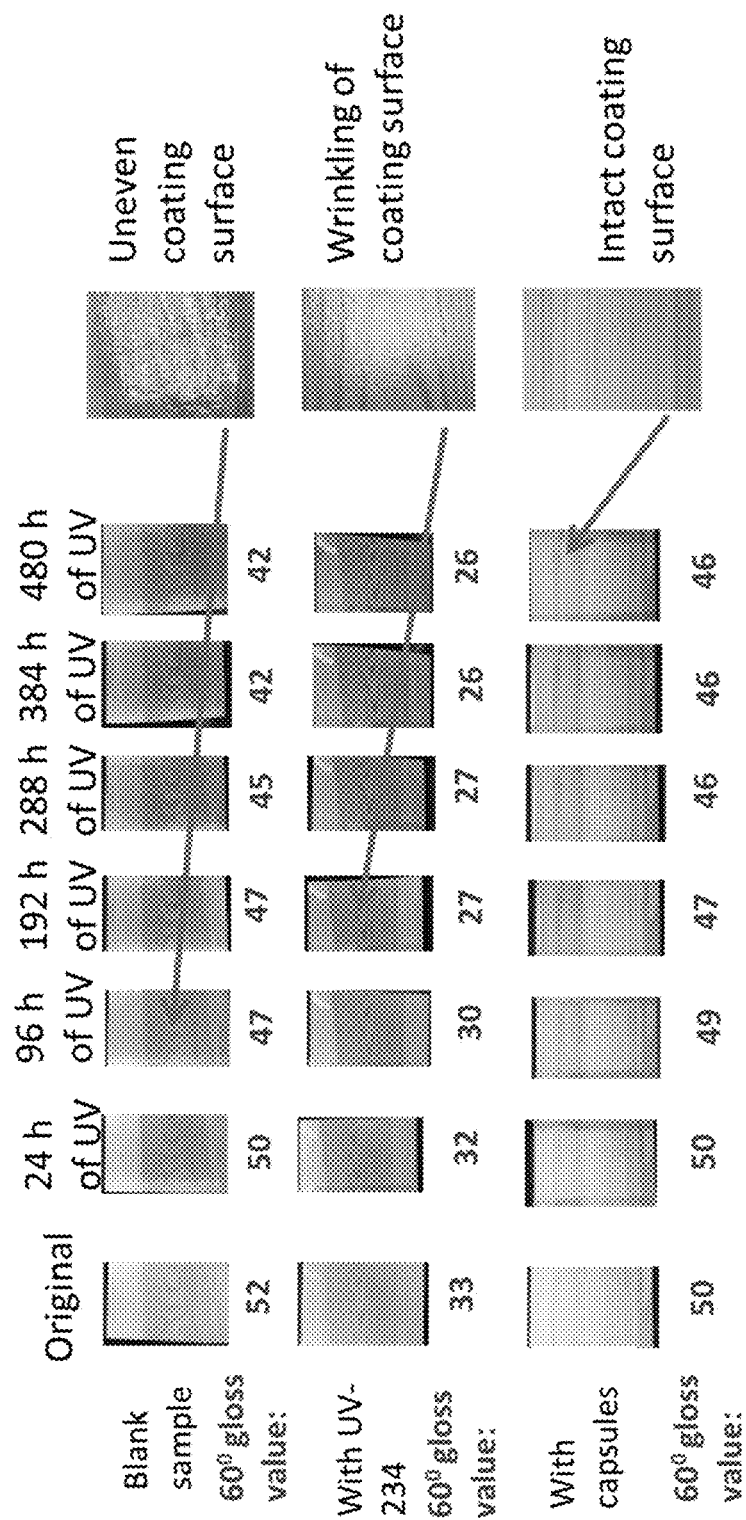
FIG. 14 shows the surface gloss values of the wood samples uncoated and coated under UV exposure.
Figure 15:
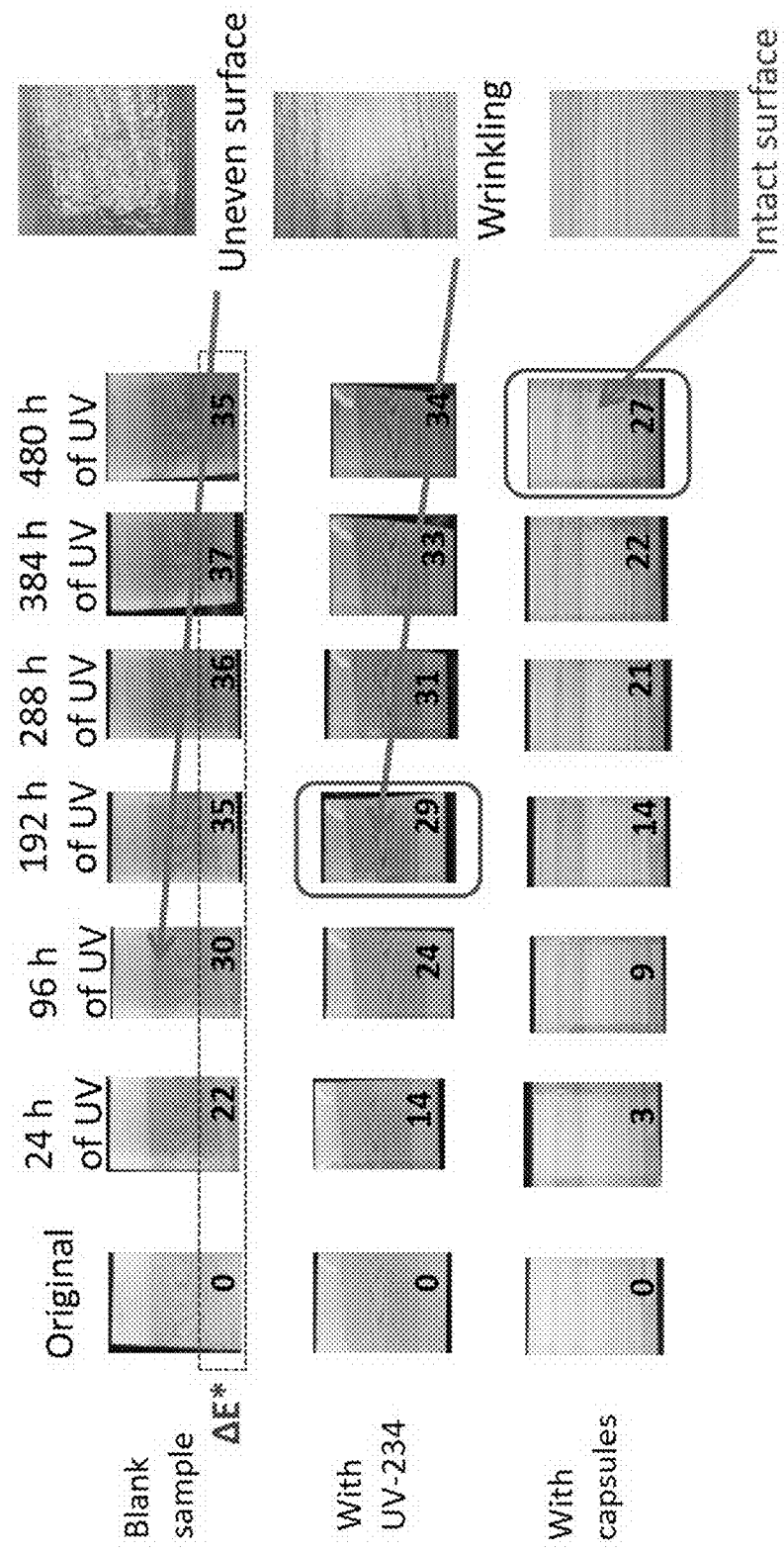
FIG. 15 shows the colour deviation (ΔE*) values of the wood samples uncoated and coated under UV exposure.

Then the pinewood plate samples were placed into QUV chamber for accelerated weathering tests according ASTM G154 standard. The samples were taken out at predetermined intervals to investigate their surface appearance, surface gloss and colour deviation ($\Delta E^*$). The surface gloss and colour deviation ($\Delta E^*$) values of the pinewood plate samples under UV exposure were recorded as shown in FIG. 14 and FIG. 15.

After more than twice of the irradiance time (480 h), the sample with capsules still has less color deviation ($\Delta E^*$), less gloss loss rate than sample with 234 (after 192 h of irradiance). Moreover, sample with 234 failed with wrinkling after 192 h while sample with capsules remains intact after 480 h of irradiance. Thus, the service lifes of samples with capsules are extended to over 200% of that of pure Tinuvin 234.

The encapsulated particles of the present disclosure can be used for a wide variety of applications including, but not limited to, coatings, paints, adhesives, inks, lubricants, construction materials, electrical appliances, furniture, household products, and plastic products.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. An encapsulated particle comprising:
   a core comprising an anti-ultraviolet (UV) agent, wherein the anti-UV agent is zinc oxide and the core has a size between 30 nm and 20 µm; and
   a first shell at least partially enclosing the core and comprising a first polymer, wherein the first polymer is a metal alginate, the first shell has a thickness between 160 µm and 2 mm; or
   a core comprising an anti-UV agent wherein the anti-UV agent is (2-(2H-benzotriazol-2-yl)-4,6-bis(1-methyl-1-phenylethyl))phenol) and the core has a size between 500 nm and 20 µm and
   a first shell at least partially enclosing the core and comprising a first polymer, wherein the first polymer is poly(methyl methacrylate) and the first shell has a thickness between 160 µm and 2 mm.

2. The encapsulated particle of claim 1 further comprising a second shell enclosing at least partially the first shell and comprising a second polymer.

3. The encapsulated particle of claim 2, wherein the second polymer is a polysaccharide, a gelatin, a polyacrylate, a polystyrene, a polyurethane, a chitosan, or a polyester.

4. The encapsulated particle of claim 2, wherein the second shell has a thickness between 2 µm and 1000 µm.

5. The encapsulated particle of claim 2 further comprising a third shell enclosing at least partially the second shell and comprising a third polymer.

6. The encapsulated particle of claim 2, wherein the anti-UV agent is zinc oxide, the core has a size between 30 nm and 500 nm, the first polymer is a metal alginate, the first shell has a thickness between 50 μm and 1 mm, the second polymer is chitosan, and the second shell has a thickness between 2 μm and 1000 μm.

7. A coating comprising:
   a matrix; and
   a plurality of encapsulated particles of claim 1, wherein the plurality of encapsulated particles are present within the matrix.

8. The coating of claim 7, wherein the matrix comprises a polymeric matrix.

9. The coating of claim 8, wherein the polymeric matrix comprises a polyester.

10. The coating of claim 7 further comprising a dye.

11. An article comprising:
    a matrix; and
    a plurality of encapsulated particles of claim 1, wherein the plurality of encapsulated particles are present within the matrix.

12. The article of claim 11, wherein the matrix comprises a polymeric matrix.

13. The article of claim 12, wherein the polymeric matrix comprises a polyester or a polypropylene.

* * * * *